(12) United States Patent
Morton et al.

(10) Patent No.: US 11,092,871 B2
(45) Date of Patent: Aug. 17, 2021

(54) LINEARIZED MACH ZEHNDER INTERFEROMETER (MZI) MODULATOR

(71) Applicant: Morton Photonics, West Friendship, MD (US)

(72) Inventors: Paul A. Morton, West Friendship, MD (US); Jacob Khurgin, Pikesville, MD (US)

(73) Assignee: Morton Photonics, West Friendship, MD (US)

( * ) Notice: Subject to any disclaimer, the term of this patent is extended or adjusted under 35 U.S.C. 154(b) by 0 days.

(21) Appl. No.: 16/915,170

(22) Filed: Jun. 29, 2020

(65) Prior Publication Data

US 2020/0409229 A1 Dec. 31, 2020

Related U.S. Application Data

(60) Provisional application No. 62/868,842, filed on Jun. 28, 2019.

(51) Int. Cl.
*G02F 1/225* (2006.01)
*G02F 1/21* (2006.01)

(52) U.S. Cl.
CPC .......... *G02F 1/2255* (2013.01); *G02F 1/212* (2021.01)

(58) Field of Classification Search
CPC .......... G02F 1/035; G02F 1/212; G02F 1/225; G02F 1/2255; G02F 1/2257; G02F 2203/56
USPC .......................................... 385/1–3
See application file for complete search history.

(56) References Cited

U.S. PATENT DOCUMENTS

2004/0218931 A1* 11/2004 Frederiksen, Jr. .... G02F 1/0123
398/198

* cited by examiner

*Primary Examiner* — Michael P Mooney
(74) *Attorney, Agent, or Firm* — Nadya Reingand; Yan Hunkin

(57) ABSTRACT

A novel transmitter is proposed that provides broadband all-optical linearization of a Mach-Zehnder interferometer (MZI) modulator for use in high linearity RF photonic links and optical up-converter and down-converter schemes. It is based on an amplitude modulated (AM) MZI modulator where part of the laser Carrier is passed around the MZI modulator and added back to the AM signal, creating a Controlled Carrier-AM (CC-AM) signal. In this new scheme, a dual output MZI modulator is utilized, and the alternative output (Carrier*) is used together with the Carrier from the laser to create a new signal, LO*, which when coherently combined with the AM signal can reduce or completely cancel its 3rd order intermodulation distortion.

20 Claims, 10 Drawing Sheets

LINEARIZED MACH ZEHNDER INTERFEROMETER (MZI) MODULATOR

CROSS-REFERENCE TO RELATED APPLICATIONS

This patent application claims priority to the U.S. provisional patent application No. 62/868,842, "Linearized Mach-Zehnder Interferometer (MZI) Modulator", filed on Jun. 28, 2019, and fully incorporated herein by reference.

STATEMENT REGARDING FEDERAL SPONSORED RESEARCH AND DEVELOPMENT

This invention was made with U.S. Government support under Contract FA8650-19-C-1007, Air Force SBIR Project, and the U.S. Government has certain rights in the invention.

FIELD OF INVENTION

This invention relates to high performance integrated Mach Zehnder interferometer (MZI) modulators, high-performance optical transmitters utilizing MZI modulators, and to radio frequency (RF) photonics systems and analog photonic links, enabled by photonic integrated circuit (PIC) devices. RF photonics systems include high performance analog photonic links, complex modulation formats requiring an IQ modulator, e.g. quadrature amplitude modulation (QAM), single sideband (SSB) modulation, and optical frequency division multiplexed (OFDM) signals, as well as systems incorporating optical up-conversion and optical down-conversion.

BACKGROUND

High-performance RF photonic links, e.g. high dynamic range analog photonic links, are key to the operation of many RF systems. Historically, these analog photonic links, which operate with a high Spurious Free Dynamic Range (SFDR), are built from three major components, typically separated by optical fibers: a laser, a modulator, and a photodetector. In a high-SFDR system, the laser provides high optical power with very low noise, in particular the laser relative intensity noise (RIN). The modulator provides high efficiency, high-speed modulation, and in particular the modulator nonlinearity provides the distortion products that limit the system linearity. An MZI modulator is usually chosen as it provides better nonlinearity performance, i.e. higher system SFDR than using, e.g. direct modulation or an electro-absorption modulator. The photodetector should be designed for high-power, high-frequency, and high-linearity operation.

An RF photonic link or RF photonic processing system, such as an optical up-converter or optical down-converter, will utilize an MZI modulator in order to improve the linearity or SFDR of the system. The system SFDR is limited by the third order intermodulation distortion components created by the MZI modulator. This invention improves the system SFDR of these systems by reducing or eliminating these third order intermodulation distortion components through a novel, broadband MZI linearization scheme.

The majority of MZI modulators are integrated photonic devices or PICs as they require optical phase control between two arms of an interferometer for operation, i.e. the optical phase difference between the two arms must be held constant over long time frames in order for coherent addition of the optical signals from the two arms to provide a useful output. This is achieved in an integrated photonic device or PIC because the complete interferometer circuit of optical waveguides and couplers is on a single solid substrate, so that the phase difference between the two arms is constant other than modulation applied to the phase of the two arms. Longer term phase variations can occur due to temperature changes in the material of the modulator, etc., and so bias control schemes have been developed to provide a DC bias control to one of the interferometer arms to keep the output (average) phase difference constant, i.e. at quadrature (90° difference) for intensity modulation (IM), or null biased (180° difference) for amplitude (field) modulation (AM).

Integrated MZI modulators for RF Photonics systems have historically been fabricated from Lithium Niobate ($LiNbO_3$), as well as III-V semiconductor devices such as based on Indium Phosphide (InP) and Gallium Arsenide (GaAs), with devices also developed from polymer waveguides. A newer technology based on utilizing a CMOS silicon foundry, the Silicon Photonics platform, can use MZI modulators fabricated directly within silicon waveguides that include doped silicon phase modulation sections, or improved performance can be achieved by integrating III-V or thin-film Lithium Niobate on/with silicon waveguides to create the MZI modulators. The proposed invention can be utilized with any MZI modulator device, fabricated from any material system, including Lithium Niobate, III-V materials, group IV materials including silicon, and polymer waveguides.

Examples of an integrated MZI modulator are shown in FIGS. 1A-1C. These are integrated photonics devices that can be created in a variety of material platforms, through the integration of optical waveguides, phase modulation sections of these optical waveguides, plus the use of integrated couplers to create the interferometer. A more general MZI modulator is shown in FIG. 1A, which shows two potential optical inputs to a 50/50 coupler, that may be a 2:2 directional coupler, with high speed phase modulators shown on both arms of the interferometer (a single phase modulator on one arm of the interferometer is another option), with the two arms of the interferometer combined in a second 50/50 coupler, providing two potential outputs. A DC phase control element is used to control the phase difference between the two arms of the interferometer, i.e. to set the average phase difference and control the operation of the MZI modulator. This general MZI modulator includes two RF signals, providing an RF signal and inverted RF signal to the two phase modulator electrodes on opposite arms, driving the modulator in a push-pull configuration to improve the efficiency of the device. Alternatively, a single RF signal can drive a single phase modulator on one arm of the MZI modulator, or other options can be used.

An MZI modulator with a single optical input is shown in FIG. 1B, in which the input coupler is now a 1:2 splitter device, i.e. also a 1:2 coupler, providing equal optical powers to the two arms of the MZI. This device is again shown with two potential outputs. The third version of MZI modulator, shown in FIG. 1C, has a single optical input and a single optical output. This configuration is provided in typical commercial MZI modulators. The alternative output port is not available in these devices; either the design utilizes a 2:1 combiner (coupler) as shown in FIG. 1C, in which case the power that would go to the alternative output is dissipated within the device, or the design uses a 2:2 coupler as shown in FIG. 1B, and the second output port is not used, i.e. that output waveguide is not connected.

In an integrated MZI modulator it is important to achieve a 50/50 split ratio on the input coupler/splitter, to achieve a high output extinction ratio, i.e. on/off ratio. The transfer characteristic for the optical power/intensity out of the MZI modulator versus the input voltage (swing) to the modulator is shown in FIG. 2A. The output power/intensity is maximum for 0 V bias, i.e. when the outputs of the two interferometer arms are in phase with each other. A minimum power/intensity occurs at +/−Vπ, which would be a zero output if the device had an infinite extinction ratio. The output power/intensity peaks again at +/−2Vπ, and follows a sinusoidal transfer characteristic as shown in FIG. 2A. Vπ is the voltage required to go from maximum output to a minimum output, i.e. a π phase difference between the two arms of the interferometer (this value is divided by 2 for a push-pull modulator as shown in FIGS. 1A-1C). When operated as an Intensity Modulator (IM), the MZI modulator is usually biased at one of the quadrature points, i.e. +/−π/2; one of these quadrature points, on the positive slope of the transfer characteristic, is shown in FIG. 2A as the IM bias point. The DC bias (phase) control element is used to set the MZI modulator to one of these quadrature points. When biased at a quadrature point, for IM, the slope of output power versus input voltage is maximum, providing the most efficient modulation point, plus the second order intermodulation distortion products are minimized. The third order intermodulation distortion products are constant no matter what the DC bias point. It is these third order intermodulation distortion products that limit the linearity/SFDR of an RF photonic link incorporating an MZI modulator. These are directly due to the sinusoidal modulation shape of the transfer characteristic. The SFDR incorporates the third order intermodulation distortion produced by the modulator, plus the noise of the RF photonic link, which when optimized (high optical power on the photodetector) is mainly due to the RIN of the laser. One approach to improve SFDR in an IM RF photonic link is to change the IM bias point, moving it to provide a lower average/DC optical power from the modulator (sometimes called 'low biasing'), therefore reducing the effects of laser RIN on the system. This approach has shown some improvement in SFDR, however, second order intermodulation distortion products become dominant in a wideband system.

An alternative to Intensity Modulation (IM), in which the power/intensity is modulated, is to use Amplitude Modulation (AM), where the field/amplitude of the optical signal is modulated rather than the power/intensity. The field transfer characteristic for an MZI modulator is also shown in FIG. 2A, in this case the MZI modulator is biased at a zero output point, i.e. null biased, with the field transfer characteristic requiring 2Vπ to go from maximum field (+1) to minimum field (−1) (this value is divided by 2 for a push-pull modulator as shown in FIGS. 1A-1C). Because the MZI modulator is null biased, i.e. minimum output power, for AM, the optical signal has a very small carrier component (its value depends on the extinction ratio of the modulator). This can be seen from the optical spectra shown in FIG. 2B, in which the top curve is the single optical frequency from the laser, i.e. the carrier (the shape/width of the optical spectrum analyzer curve for the single frequency carrier signal is due to the two optical filters used within the optical spectrum analyzer). The IM curve is reduced at the lasing wavelength by the insertion loss of the MZI modulator and from the 50% (−3 dB) reduction due to biasing the device at quadrature, with modulation sidebands at +/−10 GHz in this particular measurement. The null biased AM curve has a significantly lower carrier signal, i.e. 20 dB (100×) lower than for the IM signal, set by the extinction ratio (on/off ratio) of the MZI modulator. Additionally, the modulation sidebands of the AM signal at +/−10 GHz are larger than the modulation sidebands for the IM case (for the same RF modulation signal). These larger modulation sidebands are an advantage of the AM scheme over the IM scheme.

RF photonic links utilizing IM are shown in FIG. 3A-3B. Such an RF photonic link includes a high-power, low RIN laser connected to the MZI modulator either with an optical fiber for discrete components, or with an integrated waveguide as part of a PIC device. The output of the modulator is connected to a high-speed, high-power photodetector, the electrical output of which is the RF output of the system. FIG. 3A shows the typical case of an MZI modulator with a single output connected to a single photodetector, which provides the RF output. Alternatively, as shown in FIG. 3B, both outputs of the MZI modulator can be utilized; when biased at quadrature, the alternative output of the modulator is an inverted version of the standard output. Because of this, these two outputs, if available, can be fed into a balanced photodetector which provides a single RF output. In this case, using both outputs on the balanced photodetector cancels out much of the laser carrier RIN, additionally, using both optical signals provides an increase in output RF power.

RF photonic links utilizing AM are shown in FIGS. 4A-4B. These are more complicated than the simple IM scheme, as these are coherent optical systems that require an optical local oscillator in order to be detected, however, they can provide performance advantages. The AM scheme itself provides strong modulation sidebands (larger than in the IM scheme), while the carrier is significantly reduced (zero in the ideal case), and therefore an external Carrier (homodyne detection) is required at the photodetector to provide the required RF output [for a Prior Art example see reference; R. Montgomery, R. DeSalvo, 'A Novel Technique for Double Sideband Suppressed Carrier Modulation of Optical Fields', IEEE Photonics Technology Letters, 7, 4, p 434 (1995)]. This effectively provides a Dual Sideband Suppressed Carrier signal (DSB-SC), requiring a coherent Carrier signal, or local oscillator (LO), to be mixed with it in the photodetector to provide a large RF output. A simple approach to meet this requirement is shown in the two figures in FIGS. 4A-4B, which combine the creation of the AM signal and the required Carrier/LO signal onto a single integrated photonic device/PIC, i.e. that incorporates the required optical phase control between the AM and Carrier/LO signals. The approach keeps all of the elements that require optical phase control on a single PIC device, this single device shown by the dotted boxes in FIGS. 4A-4B, providing what we call a Controlled Carrier Amplitude Modulated (CC-AM) transmitter, i.e. this optical circuit provides the required amplitude modulated sidebands plus the level of carrier added back to the AM signal is decided by choosing the split ratio of power to the MZI modulator and to the Carrier/LO arm of the transmitter interferometer.

It is important to recognize that using the coherent scheme shown in FIGS. 4A-4B, the CC-AM scheme, control of the optical phase difference between the two arms is important, typically requiring that the complete CC-AM transmitter should be fabricated on the same solid substrate, i.e. in the same PIC. This will provide a constant optical phase difference over reasonable timescales, so that the device operates well in a system. In this system, a change in the optical phase difference between the Carrier and the AM signal will lead to a change in the phase of the RF signal produced from the photodetector, e.g. see reference [P. A. Morton and J. B. Khurgin, 'Microwave Photonic Delay Line With Separate Tuning of the Optical Carrier', IEEE Phot. Tech. Lett., 21, p 1686 (2009)]. This can be important in systems that utilize the RF phase or a True Time Delay (TTD), such as in an electronically scanned phased array system or 5G RF beamforming. For such systems to operate correctly, this change in optical phase/RF phase should be minimized, or allowed only to happen on such a long timescale as to not affect the system operation.

Considering the operation of the CC-AM transmitter shown in FIGS. 4A-4B, the output of a high power, low RIN laser is split into two parts, one passes through the top path (see FIG. 4A) through an MZI modulator that is null biased to provide AM. One output port of this MZI modulator provides the AM signal, which includes the two strong modulation sidebands (plus harmonics) with a suppressed carrier. The other output port of the MZI modulator provides the majority of the laser carrier signal, plus different modulation components; this output is denoted as 'Carrier*' in this and other figures, and will be utilized in this invention to linearize the transmitter output. For the AM case, this alternative output, Carrier*, which is the 'maximum biased' output of the MZI modulator is normally ignored. The part of the laser signal passing through the lower path is the Carrier or LO that will be combined with the AM signal in a photodetector, the homodyne output of which provides the system RF output. FIG. 4A shows the case where the AM signal and carrier/LO signal are combined, i.e. a 2:1 coupler, to provide a single optical output, to a single photodetector, which provides the system RF output. FIG. 4B shows the case where the AM signal and carrier/LO signal are combined in a 2:2 coupler, producing two outputs (out of phase with each other), which when applied to a balanced photodetector produces the system RF output. In this case, the balanced photodetector provides cancellation of the laser carrier RIN, as well as cancellation of even order distortion products, e.g. second harmonic signals, and also produces a larger RF output by utilizing all of the optical signal power from the AM and Carrier/LO signals. In FIG. 4B and all further figures in this document, the MZI modulator is simplified for ease of clarity of the figures, to a simple box with a single optical input and two optical outputs, and a single RF signal input which covers the case of both single drive and dual-drive (push-pull) MZI modulators.

The CC-AM scheme can provide improvements in performance over the IM scheme, although for an increase in complexity. This optical circuit complexity can be removed by creating the CC-AM transmitter on a single PIC device. The AM modulation provides larger modulation sidebands, while the optical power in the carrier can be controlled to improve system SFDR by choosing the optimum split ratio of laser power.

While the CC-AM scheme can provide improvements over the IM scheme for a standard RF photonic link, this approach can be further extended to provide improved performance for RF Photonic links using advanced modulation formats, e.g. by combining two such schemes as an I-Q modulator that can be utilized for, e.g. high order quadrature amplitude modulation (QAM), or for single sideband modulation (SSB), or for use in cellular systems using Optical Frequency Division Multiplexing (OFDM). Further, by exchanging the Carrier/LO signal in the CC-AM scheme with a frequency locked optical LO signal of a different frequency (i.e. a heterodyne system rather than a homodyne system), plus appropriate filtering, a very high performance (high SFDR) RF up-conversion or down-conversion system can be created, e.g. see reference [A. J. Stark et al, 'Photonic Frequency Conversion for Dynamic Spectral Access and Signal Remoting, IEEE Photonics conference (IPC), TuA3.2, (2016)]. In this invention, the concept shown to linearize a CC-AM MZI modulator is also shown to linearize these additional CC-AM based schemes; an I-Q modulator for many advanced modulation formats, with the example for a SSB system described in detail, plus optical up-conversion and optical down-conversion schemes, as described in the Summary and Detailed Description of the Preferred Embodiments.

SUMMARY

In this invention, the Prior Art CC-AM scheme described in the Background section and in FIGS. 4A-4B is linearized through a novel optical scheme, shown in FIG. 5B. This new approach takes the alternative output (Carrier*) of an MZI modulator that is null biased for AM output (on the main output port), attenuates and combines that Carrier* signal 180° out of phase with the Carrier signal split from the laser, to create a new optical signal LO*=Carrier−attenuated Carrier*. When this new LO* signal is homodyned with the AM signal it removes or significantly reduces the third order intermodulation distortion products of the AM signal, thereby linearizing the output signal and improving the linearity/SFDR of the optical system. To explain this linearization scheme, FIG. 5A shows the CC-AM scheme of FIGS. 4A-4B together with depictions of the signals present in different parts of the transmitter. The AM signal from the MZI modulator (calculated from the expansion of sin(x), which is an odd function) includes the RF signal X, a negative third order intermodulation distortion component $-X^3$, and a positive fifth order intermodulation distortion component $+X^5$. The Carrier signal in the lower arm is just a DC signal, i.e. depicted as 1. When these two signals, the AM signal and the Carrier signal are mixed in the photodetector, i.e. homodyned, the RF output, which is a multiplication of these two signals, is the same as the AM optical signals, i.e. the fundamental X, a negative third order intermodulation distortion component $-X^3$, and a positive fifth order intermodulation distortion component $+X^5$.

The linearized CC-AM scheme shown in FIG. 5B (also in FIGS. 6 and 7) has the same AM signal on the top arm as in FIG. 5A, however, a new signal LO* is generated that will linearize the AM signal when mixed with it (homodyned) in the photodetector, by canceling out the third order intermodulation distortion components of the AM signal. In order to generate the new linearizing LO* signal, the alternative output of the MZI modulator, Carrier* is utilized. While the AM signal includes odd harmonics of the RF signal, i.e. X, $-X^3$, and $+X^5$, the Carrier* signal (calculated from the expansion of cos(x), which is an even function) includes a large DC component (the laser carrier) and even harmonics of the RF signal, i.e. 1, $-X^2$, and $+X^4$. In this scheme, this Carrier* signal is attenuated to the correct level (a calculated percentage of the Carrier signal), and then subtracted from the Carrier signal in the lower arm to provide the linearizing signal LO* ($=1+X^2-X^4$), where '1' just depicts a DC value (positive because Carrier is larger than Carrier*). This is achieved by controlling the phase of the interferometer at the combiner that creates the LO* signal, in order to minimize the output of that combiner (as Carrier* is much smaller than Carrier). For example, the phase of the lower Carrier arm can be varied using a thermal phase control element, e.g. a heater next to the waveguide, in order to minimize the level of LO*. Alternatively, the correct phase of the different arms of this interferometer can be fixed through the detailed design of the PIC. When the linearizing LO* signal $(1+X^2-X^4)$ is mixed/multiplied with the AM signal $(1-X^3+X^5)$ two third order intermodulation distortion terms are generated, with opposite signs, and so through using the optimum ratio of Carrier and Carrier* to create LO*, the third order intermodulation distortion terms in the RF output can be canceled out. Canceling or reducing the third order intermodulation distortion terms improves the linearity of the transmitter, leading to improved system SFDR. This is explained in further detail in the detailed description of the preferred embodiments.

The same concept described for linearizing the CC-AM transmitter can be used to linearize the RF output of a system utilizing an I-Q modulator, made of a combination of two CC-AM transmitters. An I-Q modulator can be used to create complex modulation formats, e.g. quadrature amplitude modulation (QAM), single sideband modulation (SSB), and optical frequency division multiplexing (OFDM). SSB is important for many RF photonic systems, and is chosen as an example for I-Q modulator linearization—being shown in FIG. 8A. This linearized I-Q SSB scheme is generalized to cover QAM, OFDM and other general I-Q modulation schemes by swapping the output (fourth) coupler and balanced photodetector with a phase-diversity receiver, such as shown in FIG. 8B, including a 90° optical hybrid and two balanced photodetectors (Prior Art). Further, the CC-AM scheme can be extended to create high-performance (high SFDR) optical up-converter and optical down-converter systems, and both of these schemes can be linearized using the same concept, creating a linearized optical up-converter/down-converter, as shown in FIG. 9. The linearized I-Q modulator, and the linearized optical up converter and optical downconverter schemes are described in the detailed description of the preferred embodiments.

DETAILED DESCRIPTION OF THE PREFERRED EMBODIMENTS

As noted in the Background section, high SFDR RF photonic links and RF photonic systems based upon these links are typically limited by the third order intermodulation distortion products produced by the MZI modulators within the systems. Improvements in standard IM RF photonic links and associated systems can be achieved by moving to an AM based modulation scheme, such as the CC-AM scheme described in the Background section (Prior Art). However, to do so requires more complex photonic circuits that themselves require optical phase control of different parts of the circuit in order to provide high-performance operation. This can be accomplished by including all optical phase dependent parts of the optical circuit on the same solid substrate, in a single PIC device. The CC-AM modulation scheme can provide improved performance over IM schemes, also, additional versions of this scheme can provide improved performance for, e.g. an I-Q modulation scheme that can support QAM, SSB modulation, and OFDM, and optical processing schemes such as optical up-conversion and down-conversion. This invention takes the CC-AM scheme, and all associated modulation schemes, and through a novel optical circuit configuration enables the elimination or reduction of third order intermodulation distortion components, therefore linearizing the modulation scheme and improving dynamic range and system SFDR. Detailed schematics of the proposed linearized modulation schemes are shown in FIGS. 6 to 9, and these figures, together with associated analytical mathematical analysis for the Linearized CC-AM scheme, are described in this section to fully explain the operation of the invention.

Figure 6:
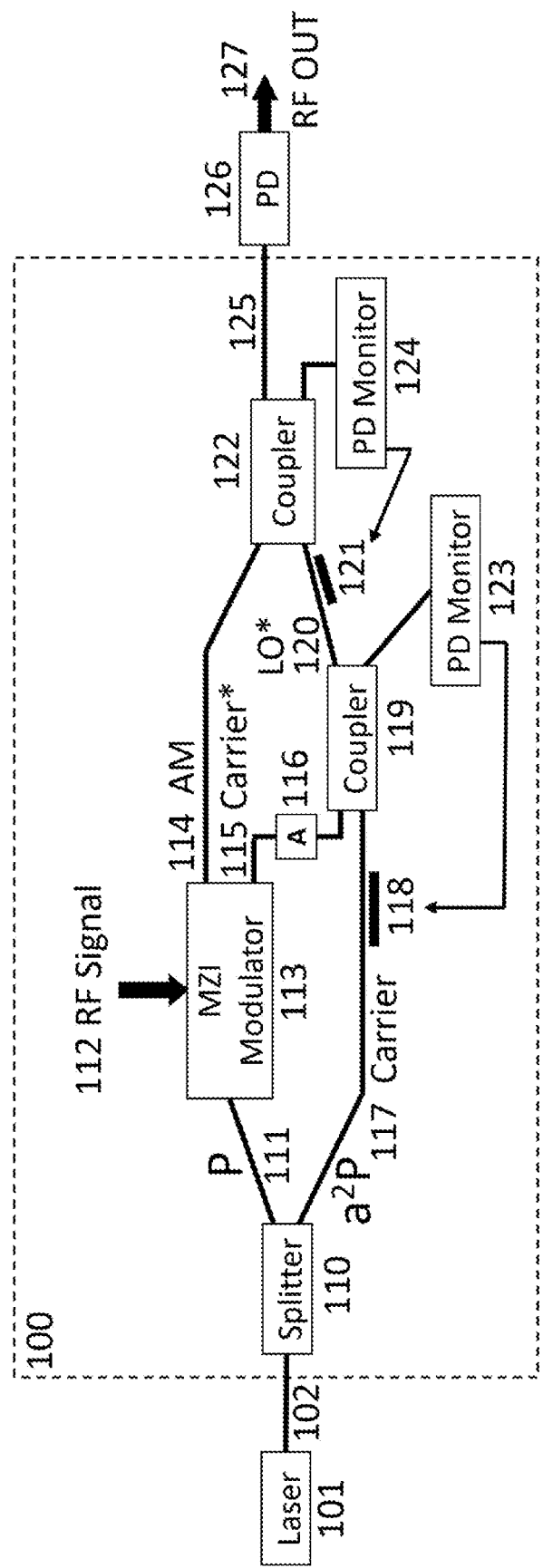
FIG. 6 shows detailed schematic of Linearized CC-AM modulation scheme.

FIG. 6 shows the Linearized CC-AM modulator configuration 100, which has an input 102, from a single frequency laser 101, that is input to splitter 110, which splits the optical power into two outputs; one output power P, 111, is input to MZI modulator 113, while the other output power $a^2P$, 117, the Carrier signal, is phase controlled in phase control element 118, before providing an input to first coupler 119. Electrical RF signal 112 drives the MZI modulator 113, that is null biased to provide an AM output signal 114, which provides an input to second coupler 122. The alternative output of the MZI modulator, 115, which is the 'maximum biased' output or Carrier*, is attenuated in attenuator 'A' element 116 to reduce the signal to the desired level, i.e. to A.Carrier*, providing a second input to coupler 119. Phase control element 118 may be a simple heater element placed close to the waveguide to modify the index of the waveguide and therefore change the optical phase of the signal passing through it. 118 can be used to set the correct phase difference between the two signals entering first coupler 119, i.e. to select that the two signals are 180° out of phase with each other, so that the combiner coherently subtracts one optical signal from the other (119 output LO* 120=Carrier−A.Carrier*). One of multiple potential options to control the phase control element 118 is to monitor the alternative output of coupler 119, e.g. using integrated photodetector (PD) monitor 123 in a feedback control loop. Maximizing the output on the PD monitor 123 ensures that the main output of coupler 119 is minimized. In order to subtract Carrier* (the smaller signal) from Carrier, the output of coupler 119 is minimized by varying phase control element 118. Monitoring the DC photocurrent from monitor 123 in a feedback loop with phase control element 118 would allow monitor 123 to be maximized, creating the correct conditions for this MZI loop. Alternatively, this MZI loop can be optimized to provide the wanted minimum output from coupler 119, providing the maximum output to the PD monitor 123, by using a standard (Prior Art) MZI modulator bias control unit, e.g. that provides a small, low frequency dither signal, e.g. 1 kHz, to phase control element 118, using harmonics of this tone measured at the PD monitor 123 to correctly set phase control element 118. On the other hand, the correct path length (and optical phase control) for the waveguides on the PIC can be chosen during design and mask layout, so that the appropriate optical phase between these two signals/paths can be designed into the PIC, in which case no phase control element 118 would be required to provide the correct output from coupler 119. The output from coupler 119, the signal LO* 120 (LO*=Carrier−A.Carrier*), is phase controlled in phase control element 121, before this signal is input to second coupler 122. The optical circuit between splitter/coupler 110 and coupler 122 creates a second larger MZI/interferometer loop. If required, the phase difference between the two arms of this loop can be controlled using phase control element 121; this would bias the large MZI loop for a specific output, based on the two inputs to coupler 122, i.e. the AM signal 114 and the LO* 120 signal. One option to control the phase control element 121 is to monitor the alternative output of coupler 122, e.g. using PD monitor 124 in a feedback control loop. In one embodiment, it is not required that this larger MZI loop be phase controlled for a specific output, it is just required that the phase difference between the two arms of that MZI loop does not change on a timescale that would negatively impact the system, i.e. long timescales such as temperature variations of the solid PIC device would not affect system performance, as they are far longer than any system time constant. The output of second coupler 122 is the output of the linearized CC-AM transmitter, and may be connected through a fiber or an optical waveguide 125 to a single photodetector 126, the electrical output of photodetector 126 providing the RF output of the system 127.

Figure 7:
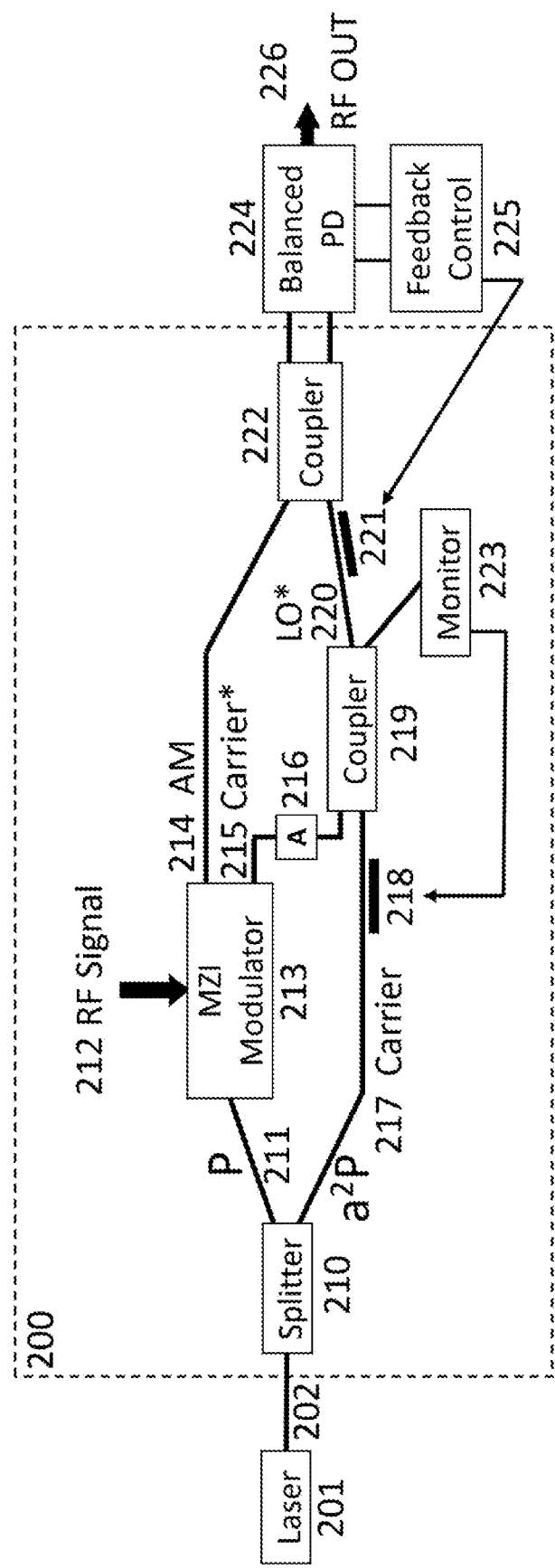
FIG. 7 shows detailed schematic of Linearized CC-AM modulation scheme including a balanced photodetector.

FIG. 7 shows a linearized CC-AM modulator configuration 200, being the same as described in FIG. 6 except that the single arm of the output/second coupler 122 connected to a single photodetector 126 in FIG. 6 are replaced by a 2:2 (50/50) output/second coupler 222 and balanced photodetector 224. This configuration provides laser RIN cancellation, cancels even order distortion products, and creates a larger RF output by utilizing all optical signal power input to coupler 222. In this case, phase control element 221 is used to set second coupler 222 at quadrature, providing the required signals (+ and −) into the balanced photodetector to cancel out laser RIN and even order distortion products. Phase control element 221 can be controlled in a feedback loop, e.g. that monitors the DC photocurrent of each of the balanced photodetectors in a feedback control system 225, that may be a digital signal processing system or an analog circuit, varying phase control element 221 to make these photocurrents equal. Alternatively, the correct path length for the waveguides on the PIC can be chosen during design and mask layout, so that the appropriate optical path length/phase between the two signals/paths in the outer MZI loop can be designed into the PIC, in which case no phase control element 221 would be required to provide the correct output from coupler 222.

In operation, linearized CC-AM modulator 200, takes the output of a single frequency laser 201, into the input splitter/coupler 210 through fiber or waveguide 202, the splitter providing two outputs, one of power P, 211, passing into MZI modulator 213, the other of power $a^2P$, 217, i.e. the Carrier, is phase controlled by phase control element 218 and then passes into first coupler 219. The input RF signal 212 drives MZI modulator 213, which is null biased to provide an output AM signal 214, which passes into output/second coupler 222. The alternative output of the MZI modulator, 215, i.e. Carrier*, is attenuated in attenuator 'A' 216 and passes into coupler 219. The 2:2 first coupler 219 combines input signals Carrier 217 and the attenuated Carrier* signal (A.Carrier*), providing an output 220, LO*, which passes through phase control element 221 into output/second Coupler 222. The alternative output of coupler 219 goes into a monitor 223, which provides a signal to control phase control element 218, therefore setting the output of first coupler 219 to a minimum, i.e. LO*=Carrier−A.Carrier*, by maximizing the alternative output to monitor 223. Output coupler 222 combines AM signal 214 and the linearizing LO* signal 220, this large outer MZI/interferometer loop being set at quadrature through control of phase control element 221, providing signals into balanced photodetector 224, which provides electrical RF output 226. Phase control element 221 can be controlled in a feedback loop that monitors the DC photocurrent of each of the balanced photodetectors in feedback control system 225, varying phase control element 221 to make these photocurrents equal.

Figure 1A:
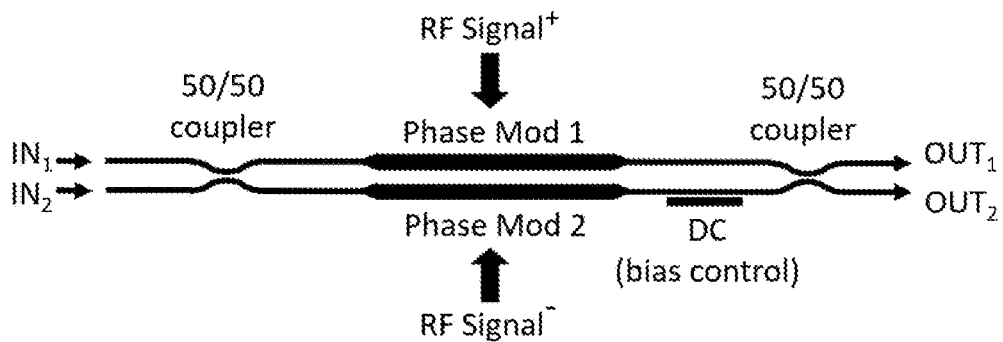
FIG. 1A shows schematic of a Mach Zehnder interferometer (MZI) based optical modulator showing two input ports and two output ports (Prior Art)
Figure 1B:
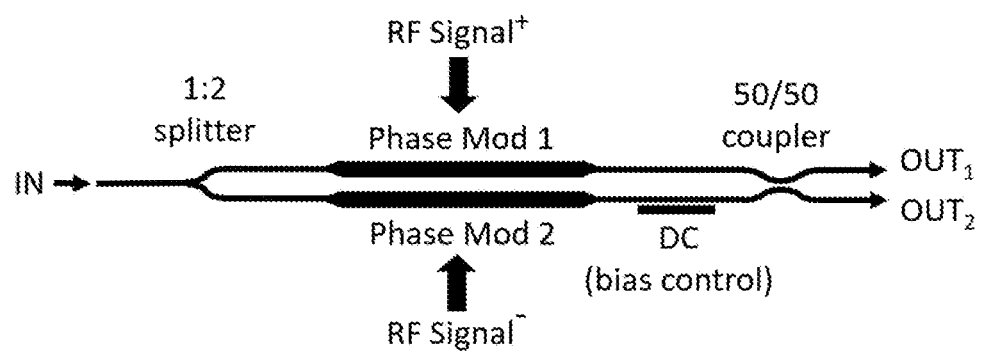
FIG. 1B shows schematic of a Mach Zehnder interferometer (MZI) based optical modulator showing a single input port and two output ports (Prior Art)
Figure 1C:
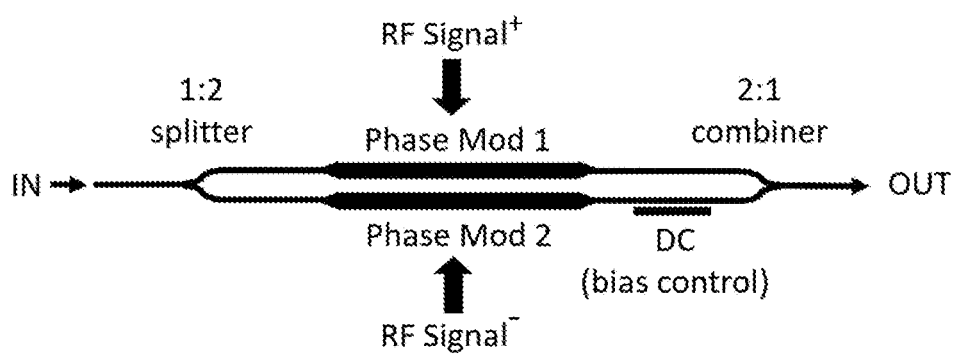
FIG. 1C shows schematic of a Mach Zehnder interferometer (MZI) based optical modulator showing a single input port and single output port (Prior Art).
Figure 2A:
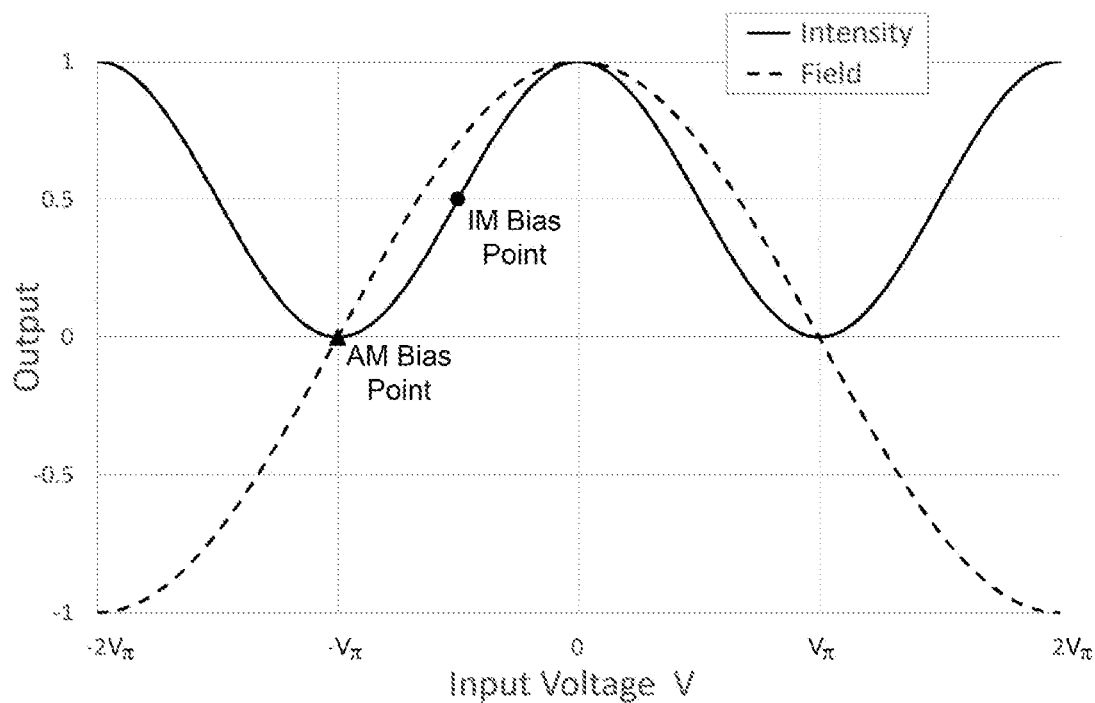
FIG. 2A shows transfer characteristics of an MZI modulator showing intensity (power) modulation (IM) transfer characteristic versus input voltage, and bias point for IM (quadrature point), also showing amplitude (field) modulation (AM) transfer characteristic versus input voltage, and bias point for AM (null bias). The full modulation range for IM is $V\pi$, while the full modulation range for AM is $2V\pi$.
Figure 2B:
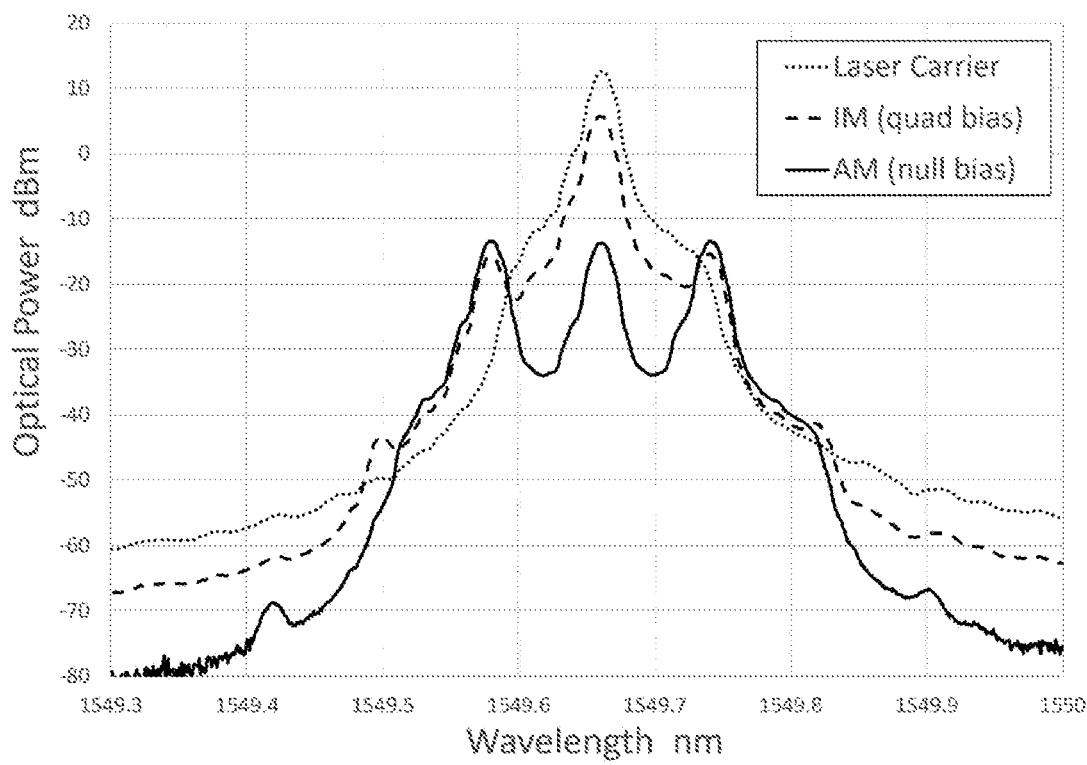
FIG. 2B shows optical spectra measurements of the laser carrier output alone, IM spectrum (quadrature$^+$ biased), and AM spectrum (null biased) (Prior Art).
Figure 3A:
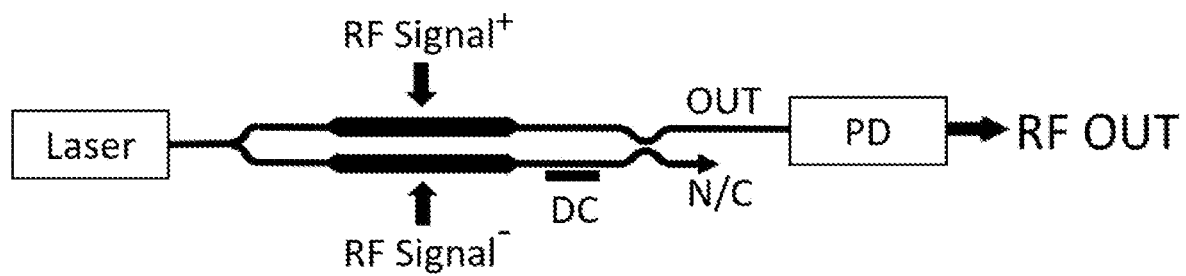
FIG. 3A shows schematic of an RF photonic link using intensity modulation (IM) using a single photodetector (Prior Art).
Figure 3B:
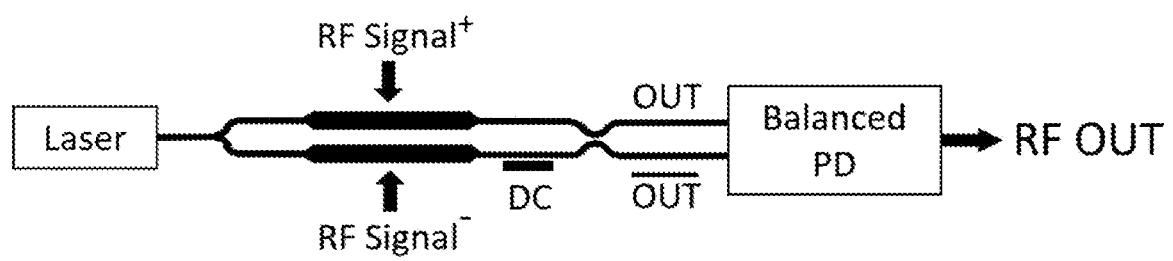
FIG. 3B shows schematic of an RF photonic link using intensity modulation (IM) using a balanced photodetector (Prior Art).
Figure 4A:
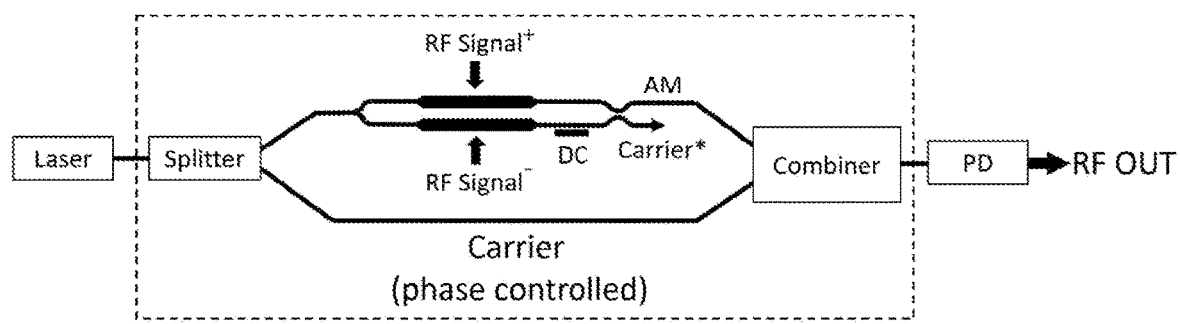
FIG. 4A shows schematic of an RF photonic link using a Controlled Carrier-Amplitude Modulation (CC-AM) modulation scheme, including an output 2:1 combiner/coupler followed by a single photodetector (Prior Art).
Figure 4B:
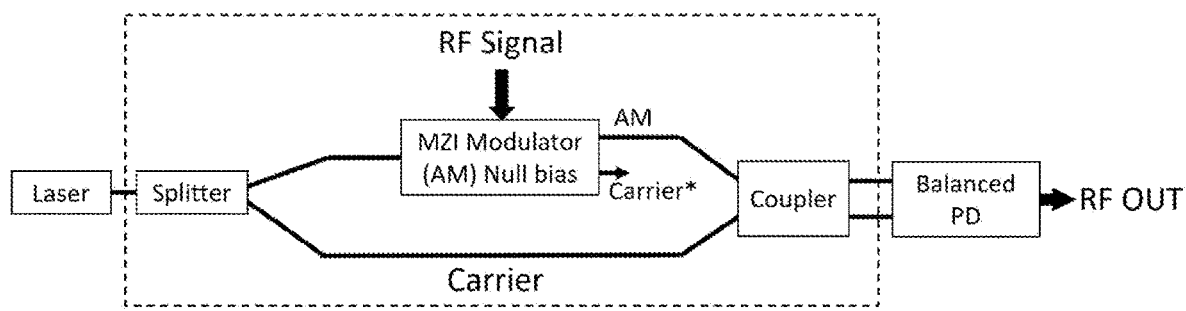
FIG. 4B shows schematic of an RF photonic link using a Controlled Carrier-Amplitude Modulation (CC-AM) modulation scheme, including an output 2:2 coupler followed by a balanced photodetector (Prior Art).
Figure 5A:
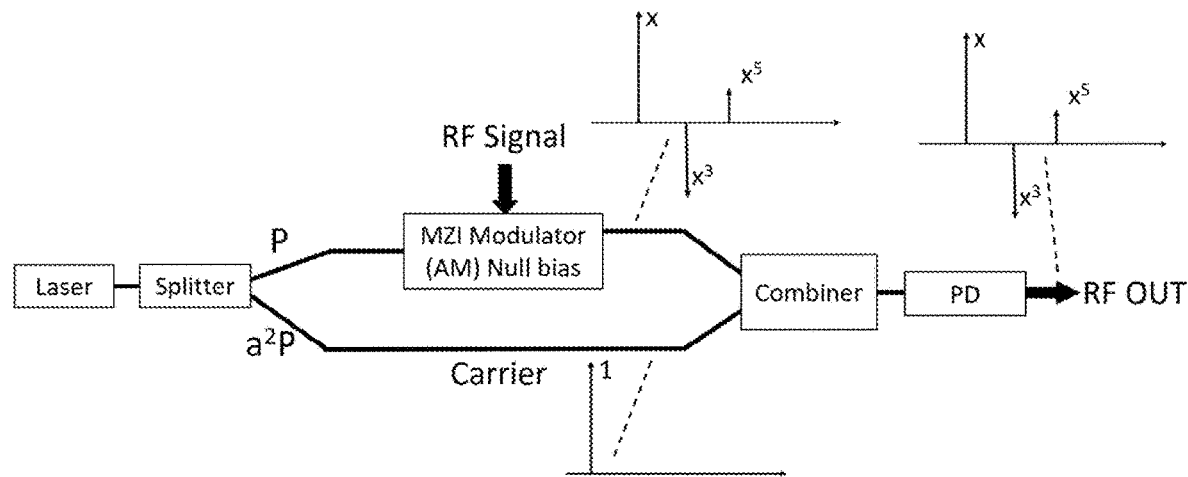
FIG. 5A shows the standard CC-AM scheme, including depictions of the signals and harmonics (Prior Art).
Figure 5B:
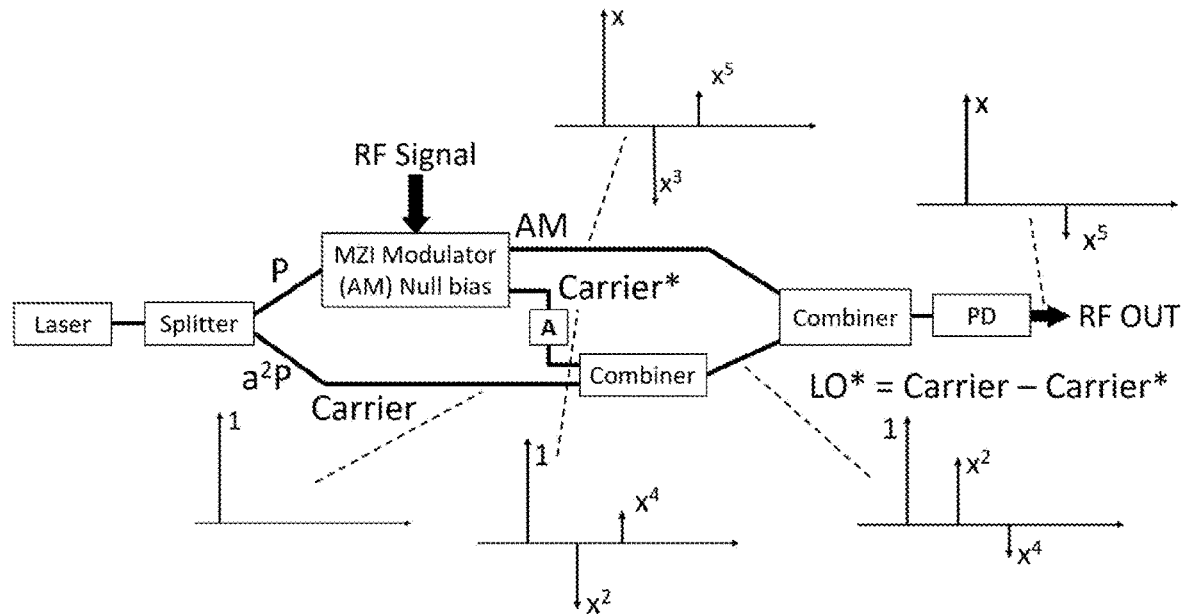
FIG. 5B shows the linearized CC-AM scheme, also including depictions of the signals and harmonics.

While FIGS. 6 and 7 and the preceding description explain an embodiment of the linearized CC-AM invention, the operation of this invention can be further described in mathematical terms, as shown in the following analysis. The same analysis has been carried out for the different modulation schemes described in this patent. Initially, consider the CC-AM scheme (FIG. 5A), which is common to the linearized CC-AM scheme (FIGS. 5B, 6 and 7). The single mode laser power, $(1+a^2)P$, is split into two (unequal) powers; P to the MZI modulator, and $a^2P$ is the Carrier in the lower arm (for a 50/50 splitter, $a^2=1$, and equal powers go to the MZI modulator and the Carrier). The RF signal is simply x(t), i.e. this analysis works for any arbitrary input RF signal. Considering one sideband, the null biased AM signal from the 'main' output of the MZI modulator is given by;

$$E_s(t) = E_0 \cos(\omega_L t)\sin[x(t)] \quad (1)$$

where $\omega_L$ is the optical frequency. Using a Taylor series expansion for sin(x) gives;

$$= E_0 \cos(\omega_L t)\left[x(t) - \frac{1}{6}x^3(t) + \frac{1}{120}x^5(t)\right] \quad (2)$$

As expected, this AM signal has no DC component, while it has the modulation signal x(t) plus additional odd harmonics, i.e. third harmonic, fifth harmonic, . . . . The other part of the laser power becomes the Carrier or homodyne 'LO' signal;

$$E_{LO} = aE_0 \cos(\omega_L t) \qquad (3)$$

The total signal at the photodetector for this CC-AM scheme is found from multiplying these signals (2, 3) together;

$$i_s(t) \sim aTE_o^2 \left[ x(t) - \frac{1}{6}x^3(t) + \frac{1}{120}x^5(t) \right] \qquad (4)$$

Equation (4) shows that the output photocurrent follows the input RF signal x(t), with a DC scaling factor a.T which includes additional losses in the system, T. The third order and fifth order distortion terms are also clearly seen. In comparison to the RF signal, x(t), the third order term is negative with a scaling factor of 1/6, while the fifth order term is positive with a scaling factor of 1/120. These are the terms responsible for third order intermodulation distortion and fifth order intermodulation distortion, respectively.

Now, consider the linearization scheme shown in FIG. 5B. (also FIGS. 6 and 7). With the MZI modulator null biased for the main output, the alternative MZI modulator output, Carrier*, is given by;

$$E^*x(t) = E_0 \cos(\omega_L t) \cos[x(t)] \qquad (5)$$

which, using a Taylor series expansion for cos(x) is;

$$= E_0 \cos(\omega_L t) \left[ 1 - \frac{1}{2}x^2(t) + \frac{1}{24}x^4(t) \right] \qquad (6)$$

This alternative output Carrier* has a strong DC carrier signal, plus even harmonics, i.e. a negative second harmonic and a positive fourth harmonic. Next, as part of the linearization scheme for CC-AM modulation, to eliminate third order distortion, this Carrier* signal is attenuated by a/4;

$$\frac{a}{4} E_0 \cos(\omega_L t) \left[ 1 - \frac{1}{2}x^2(t) + \frac{1}{24}x^4(t) \right] \qquad (7)$$

$$= aE_0 \cos(\omega_L t) \left[ \frac{1}{4} - \frac{1}{8}x^2(t) + \frac{1}{96}x^4(t) \right] \qquad (8)$$

This attenuated Carrier* signal includes a DC carrier term, with a scaling factor of a/4, a second order term which has a negative scaling factor of −a/8, and fourth order term which has a positive scaling factor of a/96. Subtracting this signal (Equation 8) from the Carrier signal (Equation 3) provides the Linearizing LO signal, LO*;

$$E_{LO}(t) = aE_0 \cos(\omega_L t) \left[ \frac{3}{4} + \frac{1}{8}x^2(t) - \frac{1}{96}x^4(t) \right] \qquad (9)$$

i.e.

$$E_{LO} = \frac{3}{4} aE_0 \cos(\omega_L t) \left[ 1 + \frac{1}{6}x^2(t) - \frac{1}{72}x^4(t) \right] \qquad (10)$$

It is important to obtain the correct ratio of Carrier to Carrier* in order to obtain the correct term to linearize the AM signal from the MZI modulator, shown in Equation 2. Mixing LO* (Equation 10) and the AM signal (Equation 2) provides the photocurrent;

$$i_s(t) \sim \frac{3}{4} aTE_o^2 \left[ x(t) - \frac{1}{6}x^3(t) + \frac{1}{120}x^5(t) \right] \left[ 1 + \frac{1}{6}x^2(t) - \frac{1}{72}x^4(t) \right] \qquad (11)$$

Expanding Equation 11 it is clear to see that the third order term has been eliminated, while at the same time the fifth order term is increased by 4×;

$$= \frac{3}{4} aTE_o^2 \left[ x(t) - \frac{1}{30}x^5(t) \right] \qquad (12)$$

These analytic expressions demonstrate the novel linearization scheme, which utilizes the normally unused second output of the MZI modulator; the main output is set at null bias to create an AM signal, while the alternative output Carrier* signal is attenuated to the required level. The attenuated Carrier* signal is then subtracted from the initial Carrier signal (i.e. added 180° out of phase) to create the new Linearizing LO signal, LO*. From the equations, it is clear that the key is to create the optimum ratio of Carrier* to Carrier signal when creating the new LO* signal, in order to linearize the AM signal. The ratio of the power of this linearizing LO* signal to power of the AM signal is not important. By varying the ratio of Carrier* to the Carrier signal the third order intermodulation distortion signals can be completely eliminated, as shown in Equation 12, in which case the fifth order intermodulation distortion signals will dominate SFDR, although at a significantly higher level of SFDR than without linearization. From the analysis described in equations 1 to 12, third order intermodulation distortion is eliminated for a ratio of attenuated Carrier*/Carrier of 1/16, which is −12 dB. Alternatively, SFDR can be maximized by choosing the ratio of attenuated Carrier* to Carrier signals so that third order intermodulation distortion signals are reduced until they equal the (increased) fifth order intermodulation distortion signals. A practical implementation could allow some tunability in the ratio of Carrier*/Carrier in order to optimize system performance.

For the simple case of eliminating third order intermodulation distortion signals, it is possible to analytically calculate the improvement in linearity, i.e. system SFDR, as follows. Considering the standard CC-AM case, the photocurrent being given by equation 4, if the input signal is 2 sinusoids, i.e. a two-tone test, $x(t) \sim x_o \sin(\omega_1 t) + x_o \sin(\omega_2 t)$, the third order term contains the intermodulation distortion term;

$$y_{IM3} = \frac{1}{6} \times \frac{3}{4} x_0^3 \sin(2\omega_1 - \omega_2) = \frac{1}{8} x_0^3 \sin(\omega_1 - \omega_2) \qquad (13)$$

and the fifth order term contains;

$$y_{IM5} = \frac{1}{120} \times \frac{25}{8} x_0^5 \sin(2\omega_1 - \omega_2) = \frac{5}{192} x_0^5 \sin(2\omega_1 - \omega_2) \qquad (14)$$

Now the input signal values for IM3 and IM5 points can be calculated;

$$x_{0IM3} = \sqrt{8} \approx 2.85 \qquad (15)$$

and $$x_{0IM5} = (192/5)^{1/4} \approx 2.48 \qquad (16)$$

In decibels this is;

$$SFDR3 = 2/3 \times (10 \log_{10} 2.82 + P - N) \qquad (17)$$

Where P includes laser power, splitting ratio, all the link loss, sensitivity etc. and N is the noise. Similarly;

$$SFDR5 = 4/5 \times (10 \log_{10} 2.48 + P - N) \approx 4/5(3/2 SFDR3 + 10 \log_{10} 0.88 \approx 1.2 \, SFDR3 \qquad (18)$$

In which case the SFDR due to fifth order intermodulation distortion is 1.2× higher than the SFDR due to third order intermodulation distortion, i.e. third order intermodulation distortion dominates.

Now considering the linearized CC-AM scheme, which produces the photocurrent in equation 12, in which the third order intermodulation distortion is eliminated. The fifth order intermodulation distortion is increased by 4×, i.e.

$$y_{IM5} = \frac{1}{30} \times \frac{25}{8} x_0^5 \sin(2\omega_1 - \omega_2) = \frac{5}{48} x_0^5 \sin(2\omega_1 - \omega_2) \qquad (22)$$

So now;

$$x_{0IM5}(48/5)^{1/4} \approx 1.77 \qquad (23)$$

The new IM5 SFDR can be calculated relative to the old/original IM3 SFDR;

$$SFDR5 = 4/5 \times (10 \log_{10} 1.77 + P - N) \approx 4/5(3/2 SFDR3 - 2) \approx 1.2 SFDR3 - 1.6 \, dB \qquad (24)$$

By eliminating third order intermodulation distortion, therefore making fifth order intermodulation distortion dominant, SFDR (in dB) is enhanced by 20% minus 1.6 dB. For an non-linearized CC-AM signal with 50 dB SFDR in 1 GHz bandwidth (i.e. 110 dB·Hz$^{2/3}$), then the linearized CC-AM approach increases SFDR to ~58 dB (118 dB·Hz$^{2/3}$), and for a non-linearized CC-AM signal with 60 dB SFDR, the linearized SFDR increases to ~70 dB (130 dB·Hz$^{2/3}$). This is a very large increase in system SFDR. A further, smaller improvement, can be made by instead of eliminating 3rd order intermodulation distortion entirely, reducing it until it equals the same value as 5th order intermodulation distortion, in this way providing an overall minimum value for intermodulation distortions. This approach can be analyzed numerically, in which case a further improvement of 1.6 dB is found.

Figure 8A:
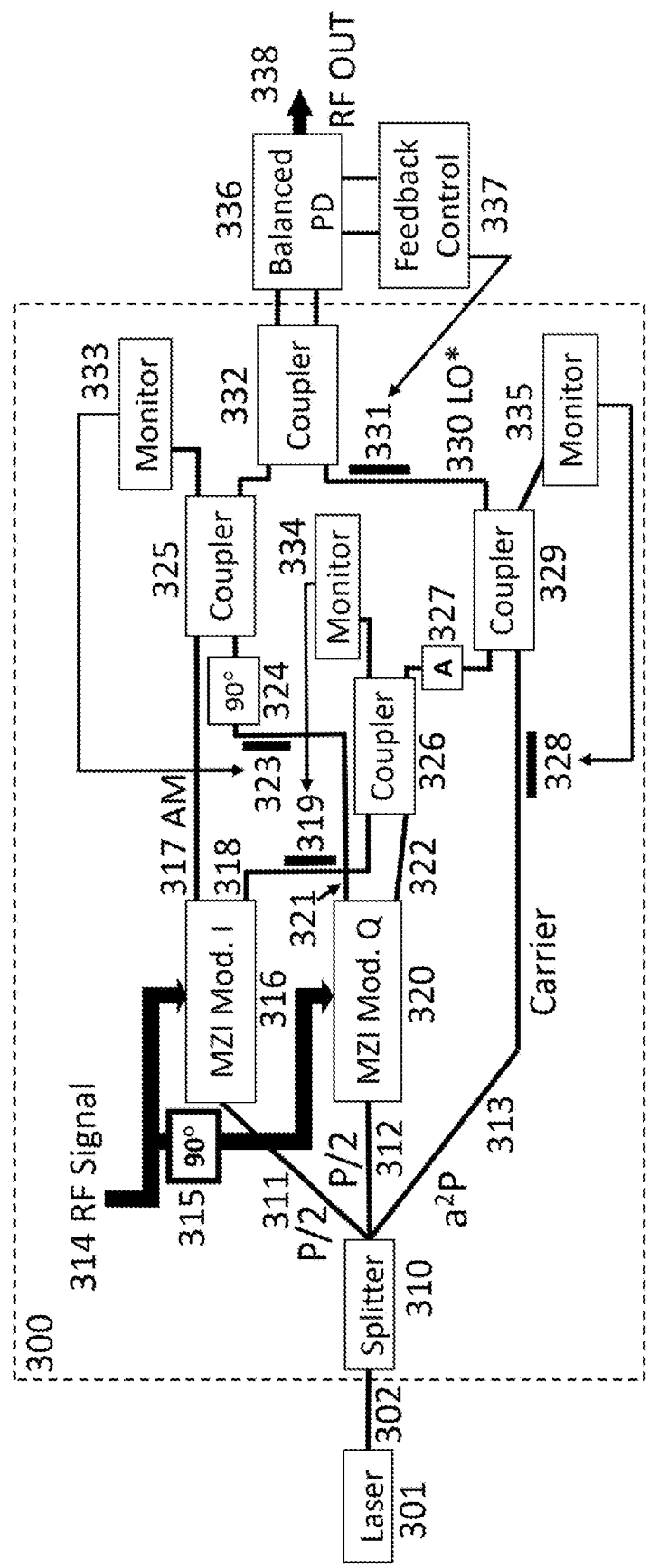
FIG. 8A shows detailed schematic of a Linearized I-Q modulation scheme for single sideband (SSB) modulation.
Figure 9:
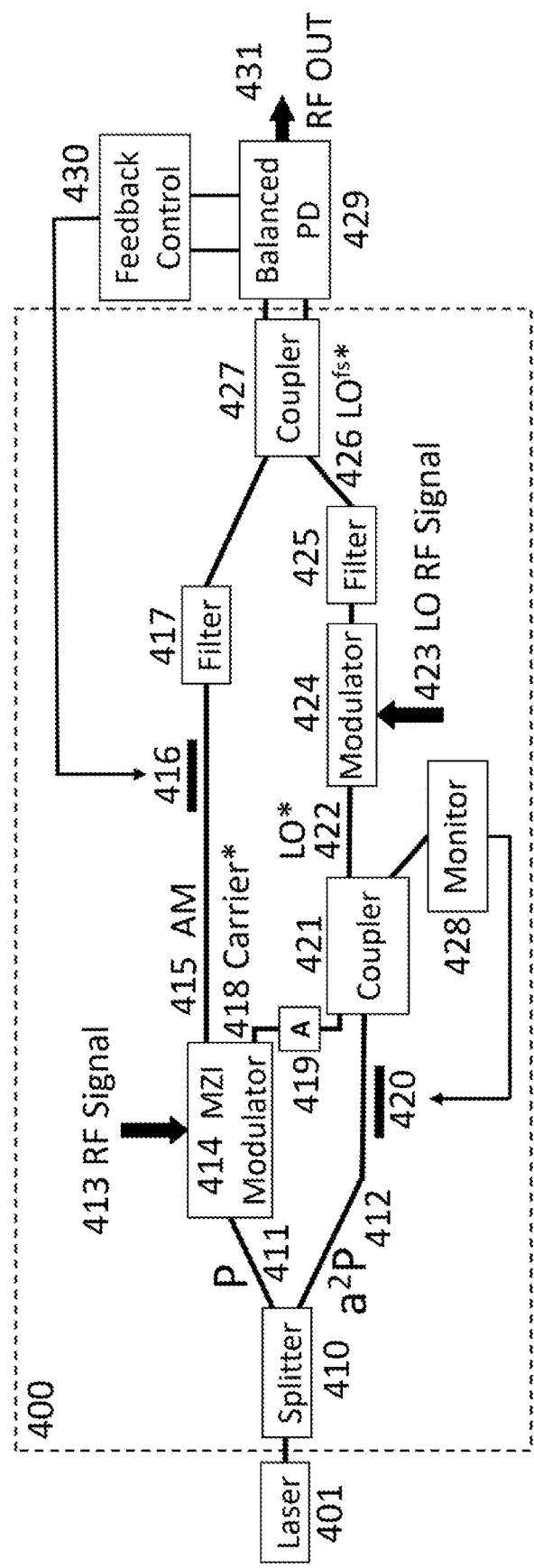
FIG. 9 shows detailed schematic of a Linearized Optical Up-Converter/Down-Converter scheme.

The linearization scheme for CC-AM shown in FIGS. 5B, 6 and 7, and further described in the previous analytic analysis, can equally be used to linearize an I-Q modulator (i.e. comprised of two linearized CC-AM modulators), as shown in FIG. 8A, as well as in an optical up-converter or optical down-converter using the CC-AM approach, as shown in FIG. 9. Similar analytic analyses demonstrate the efficacy of this approach for both the I-Q modulator, and the optical up-converter/down-converted schemes, the difference in the results being the ratio of Carrier to Carrier* required for optimum linearization.

Figure 8B:
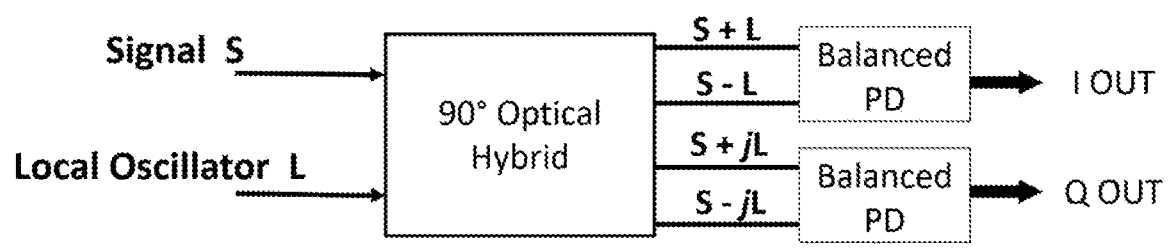
FIG. 8B shows schematic of a phase-diversity receiver (Prior Art).

FIG. 8A shows one version of a linearized I-Q modulator 300 that can be used for SSB modulation, created by combining two linearized CC-AM modulators with the appropriate 90° phase shifts in RF electrical and optical arms. Standard I-Q implementations can be used to support other modulation formats, e.g. for quadrature phase shift keying (QPSK) and higher order QAM formats, and OFDM, in which two independent inputs are applied to the two (I and Q) modulators (of FIG. 8A), plus a (Prior Art) phase-diversity receiver incorporating a 90° optical hybrid and two balanced photodetectors, as shown in FIG. 8B, replaces the output (second) coupler and single balanced photodetector. However, the same concept of this invention is utilized for linearizing these different I-Q modulation schemes. 300 shows an optical input 302 from a singlemode laser 301 into splitter 310. The splitter 310, splits the input optical power, total input power=P(1+a$^2$), into three parts, P/2 to MZI modulator I (316), P/2 to MZI modulator Q (320) and a$^2$P (313) is the Carrier in the lower arm of the device, which passes through phase control element 328 and into the first coupler 329. An input RF signal 314 is applied directly to MZI modulator I (316), while part of that RF signal 314 passes through a 90° RF phase shift 315, and is applied to MZI modulator Q (320). MZI modulator I (316) is null biased to provide an AM output 317, or I AM, which passes into the coupler 325. The alternative output of MZI modulator I, 318 or I Carrier*, is phase controlled in phase control element 319 before passing into the fourth coupler 326. MZI modulator Q (320) is null biased to provide an AM output 321, Q AM, which is phase controlled in phase control element 323 and 90° phase shifter 324, before passing into the third coupler 325. The alternative output of MZI modulator Q, 322 or Q Carrier*, passes into the fourth coupler 326. The two signals I Carrier* and Q Carrier*, are combined in the fourth coupler 326 to provide a single I-Q Carrier* signal, and if necessary phase control element 319 is used to correctly align the optical phase of the two signals (zero phase difference); however, this will likely be achieved through modulator design/layout rather than a feedback scheme. Such a feedback scheme could be created using monitor 334 on the alternative output of the fourth coupler 326, which provides the control signal for the feedback loop to control the phase control element 319. Similarly, monitor 333 on the alternative output of the third coupler 325 can be utilized to provide the control signal for the feedback loop to control phase control element 323, thereby choosing the correct (90°) phase difference between I AM and Q AM signals when combined in the third coupler 325, creating I-Q AM signal. The combined I-Q Carrier* signal is attenuated in attenuator 'A' 327 and passes into first coupler 329, which combines this attenuated I-Q Carrier* signal (A.I-Q Carrier*) with the Carrier signal to create the required linearizing LO* signal 330 (LO*=Carrier−A.I-Q Carrier*). A monitor photodiode 335, connected to the alternative output of the first coupler 329, can be used in a feedback loop to control the phase control element 328, providing the correct LO* signal 330 (i.e. minimized) by maximizing the signal on the monitor 335. This feedback loop can use DC signal values, or could use a standard MZI modulator bias control circuit using a small low-frequency dither signal applied to the phase control element 328. LO* signal 330 is phase controlled in phase control element 331, before passing into the output/second coupler 332, the other input to the second coupler 332 is the output of the third coupler 325. Phase control element 331 can be controlled in a feedback loop, using measurements of the DC bias current for each of the two photodetectors in the balanced photodetector in feedback control element 337, providing a feedback control signal to 331, in order to keep the outer MZI loop (between splitter 310 and output coupler 332) biased at quadrature, i.e. equal photocurrents in the two photodetectors of the balanced photodetector. In this design the two outputs from the second coupler 332 are fed into balanced photodetector 336, providing RF output 338.

A similar mathematical analysis for the linearized I-Q based SSB modulation scheme to that used for the linearized CC-AM modulation scheme is easily developed using the same expansion of terms for the AM signals (expansion of sin(x), an odd function), and for the Carrier* signals (expansion of cos(x), an even function), as shown previously in equations 1 to 12. In the SSB I-Q case, the combined Carrier* signal power should be reduced by $a^2/9$, i.e. the field is reduced by a/3, in order to minimize third order intermodulation distortion, which falls close to zero; whereas for the CC-AM case (equations 7 and 8) this term was $a^2/16$ (power) and a/4 (field), and the third order intermodulation distortion could be completely canceled.

In all cases, for all linearized modulation schemes (FIGS. 6 to 9), phase control elements can be controlled with a feedback loop by monitoring one or more aspects of the signals within the device, or external measurements of the performance of the overall device can be used, in order to optimize device performance. These feedback loops would utilize electrical measurements of monitor photodetectors, electrical measurements of the DC bias photocurrent of the two photodetectors in a balanced photodetector, or feedback from external measurements of system performance, such as system SFDR, using a digital signal processor, if required, to monitor and control such feedback loops. Control of the additional interferometer/MZI loops of the linearized schemes will be similar to that carried out to control the bias and operating point of the MZI modulator itself, i.e. the modulator bias control circuitry used to set the MZI modulator at a null bias on its main output port, to provide an AM output on this port. Alternatively, the complete PIC device can be designed and laid out to provide the exact path lengths/phase control between all elements of the photonic circuit, in which case none of the phase control elements or feedback loops would be required. Depending on the complexity of the device, some or all of the phase control elements and feedback control/loops may be removed and replaced by exact path lengths/phase controlled lengths for the waveguides and devices within the PIC.

FIG. 9 shows an extension of the linearized CC-AM scheme in which the input RF signal is either up-converted to a higher RF frequency or down-converted to a lower RF frequency. The laser Carrier is replaced by a different LO frequency, which is heterodyned with the AM signal to provide the frequency converted output. This could be utilized in e.g. a 5G cellular system where a baseband RF signal, from 2 to 4 GHz, must be up-converted to a millimeter wave band, e.g. 39 GHz, for the transmit signal, and on the return side a received signal at 39 GHz must be down-converted to baseband, e.g. 2 to 4 GHz. The baseband signals can be generated by a high-performance (high effective number of bits, ENOB) digital to analog converter (DAC), and baseband signals can be received by a high-performance analog to digital converter (ADC). This linearized up-converter/down-converter approach provides extremely high SFDR operation, with advantages over electronic mixing approaches, especially with the improved linearity/SFDR provided by this linearization scheme.

The linearized optical up-converter/down-converter 400 receives an input from singlemode laser 401 into splitter 410. The same device shown in FIG. 9, 400, can be used for either up-conversion or down-conversion of the input RF signal frequency to the output RF signal frequency, depending on the choice of LO RF frequency 422, the input RF frequency 413, and the chosen tunable filter (417, 424) passbands. For example, a linearized up-conversion system may have an input RF frequency or signal centered on 3 GHz, the upper sideband at +3 GHz being selected in tunable filter 417, and in order to up-convert this RF signal to +39 GHz an optical LO signal must be generated that is 39 GHz away from the chosen sideband (+3 GHz) i.e. an LO RF frequency of 42 GHz would be used if the upper sideband of the optical LO signal is chosen, or an LO RF frequency of 36 GHz would be used if the lower sideband of the optical LO signal is chosen. The input splitter 410 splits the optical power into two parts, one part of the power P, 411, goes to MZI modulator 414, the other part, $a^2P$, 412, becomes the Carrier signal on the lower arm of the optical scheme, which is phase controlled in phase control element 420 and passes into a first coupler 421. An RF signal 413 drives MZI modulator 414, which is null biased to provide AM output 415 as well as the alternative output 418, Carrier*, which is attenuated in attenuator 419 (A.Carrier*) and passes into first coupler 421. The AM signal 415, which is a Double Sideband Suppressed Carrier (DS-SC) signal, is phase controlled in phase control element 416, and then is filtered in a tunable bandpass filter 417, which selects the frequency band from the AM signal that is required to be either up-converted or down-converted (the filter removing/reducing signals in the opposite sideband and the carrier signal)—this can be either the upper sideband or the lower sideband of the AM signal. The filters in 400 are controlled by a digital signal processor, to select the appropriate frequency band for up-conversion or down-conversion, additionally the digital signal processor controls the LO RF signal 423 frequency in order to provide the correct RF output 431 central frequency. The AM signal band filtered/selected by tunable filter 417 passes into second coupler 427. First coupler 421 combines the phase controlled Carrier signal 412 with the attenuated Carrier* signal 418, (A.Carrier*), creating output LO* signal 422, which is the linearizing signal in a standard CC-AM transmitter (100 or 200), however, in this new frequency conversion scheme this LO* signal 422 is converted to a new frequency by modulating it with modulator 424 which is driven by LO RF signal 423. Modulator 424 could be an MZI modulator biased at quadrature or null biased, in either case providing a frequency shifted output signal, shifted by the LO RF signal modulation frequency (providing both upper and lower sideband versions). Alternatively, modulator 424 could be a phase modulator, which when modulated at the LO RF frequency would also provide a frequency shifted signal, again with both upper and lower sidebands, i.e. at + and − the LO RF frequency. Using a phase modulator for 424, the required frequency shift can be achieved using a harmonic of the LO RF frequency, e.g. modulate strongly at 18 GHz to create sidebands at +/−18 GHz, +/−36 GHz, etc., then utilize the tunable filter 425 to select the LO* signal at −36 GHz, which when mixed with an AM sideband at +3 GHz would up-convert the output RF signal to 39 GHz. Either upper or lower sideband, i.e. + or − modulation sideband from modulator 424, is selected by tunable filter 425, providing frequency shifted $LO^{fs*}$ signal 426 that is input to second coupler 427. Second coupler 427 takes the selected signal band of the AM signal and combines it with the selected frequency shifted $LO^{fs*}$ signal, which includes the linearizing terms created by subtracting attenuated Carrier* 418 from phase controlled Carrier 412. The two outputs from coupler 427, that are out of phase with each other, are combined in balanced photodetector 429, which provides RF output 431. The output of second coupler 427, for the outer MZI/interferometer loop, does not necessarily require phase control (from phase control element 416 and a feedback loop) as this is a heterodyne system providing equal power to each of the photodetectors in the balanced photodetector by mixing a frequency band from one sideband of the AM signal with the $LO^{fs}*$ signal, which will not interfere with the frequency band from the upper arm of the interferometer. However, small levels of the original laser Carrier are present in both arms of the interferometer, which can be utilized if required, to keep the path lengths of both sides of the interferometer aligned, e.g. this MZI loop could be kept at quadrature through a feedback loop on phase control element 416, e.g. by monitoring the DC bias for the currents of the two photodetectors in the balanced photodetector in feedback control element 430, and using the feedback loop to keep those photocurrents equal. The output of coupler 421 can be chosen by phase control element 420, using photodetector monitor 428 in a bias control loop so that the main output of coupler 421 is minimized, i.e. LO*=Carrier−Carrier*. Alternatively, all of the optical path lengths within the PIC can be controlled exactly so that the required phase differences at the two couplers (421 and 427) for the signals passing into them are controlled by PIC design/layout, in which case phase control elements (420 and 416) and related feedback control loops would not be required.

The mathematic analysis for the heterodyne scheme used for linearized optical up-conversion or linearized optical down-conversion is the same as the analysis shown for the linearized CC-AM modulation, the difference being that the DC Carrier term used in the homodyne CC-AM case is replaced by a DC Carrier term at a different frequency in this heterodyne case, that new Carrier/LO being generated by modulator 424 and filter 425. The same scheme, with the same optimum attenuated Carrier*/Carrier ratio required for eliminating third order intermodulation distortion products is found, as previously shown in the CC-AM analysis of equations 1 to 12.

Although several exemplary embodiments have been herein shown and described, those of skill in the art will recognize that many modifications and variations are possible without departing from the spirit and scope of the invention, and it is intended to measure the invention only by the appended claims.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The invention claimed is:

1. A linearized optical modulator, comprising:
a single frequency laser provides an optical input which is split into a first and a second input parts by a splitter,
wherein the first input part forms a Carrier signal, to be used for coherent detection;
wherein the second input part feeds into at least a first MZI modulator that is null biased, driven by an RF input signal;
the first MZI modulator provides a first MZI output which is an amplitude modulated (AM) optical output that includes an RF modulation and odd order distortions;
the first MZI modulator provides a second MZI output which forms a Carrier* signal, an alternative optical output that includes a DC carrier and even order distortions;
wherein the alternative output Carrier* signal is attenuated and then subtracted from the Carrier signal in a first coupler, producing a first output forming a linearizing optical local oscillator signal LO*, where LO*=Carrier−attenuated Carrier*;
wherein LO* and the AM optical output are coherently combined in a second coupler, and an output of the second coupler is mixed in a following photodetector, thus removing or reducing third order intermodulation distortion of the MZI output and providing a linearized RF output.

2. The linearized optical modulator of claim 1, wherein the output of the second coupler is a single first output, and the following photodetector is a single photodetector.

3. The linearized optical modulator of claim 2, wherein the output of the second coupler further comprises a second output being out of phase with the first output, and the following photodetector is a balanced photodetector, which provides the linearized RF output with reduced laser relative intensity noise and reduced even order distortions.

4. The linearized optical modulator of claim 1, further comprising a phase control element that controls an optical phase of the Carrier signal relative to the Carrier* signal prior to the first coupler that combines them, ensuring that a relative phase difference is 180° and that the linearizing optical local oscillator signal, LO*, is equal to Carrier−attenuated Carrier*,
wherein the first coupler having a second output being detected by a control photodetector,
wherein an output of the control photodetector forms a feedback control signal that is fed into the phase control element.

5. The linearized optical modulator of claim 1, wherein a ratio of a Carrier power to a attenuated Carrier* power at the first coupler is 16, or 12 dB.

6. The linearized optical modulator of claim 3, further comprising a phase control element that controls an optical phase of the LO* signal relative to the AM signal prior to the second coupler that combines them, ensuring that a relative phase difference is plus or minus 90°, wherein DC bias photocurrents of two photodetectors in the balanced photodetector are compared to provide a feedback control signal that is fed into the phase control element.

7. The linearized optical modulator of claim 1, wherein a first optical filter positioned prior to the second coupler selects an optical signal of one sideband of the AM signal;
wherein a frequency shifting modulator positioned after the first coupler modulates the linearizing optical local oscillator signal LO* thus generating LO$^{fs}$*, which is a frequency shifted sideband optical signal of the LO*

LO* and LO$^{fs}$* enter a second filter which outputs only LO$^{fs}$* which is coherently combined with an output of the first filter in the second coupler, providing the linearized RF output being converted to a different center RF frequency.

8. The linearized optical modulator of claim 7, wherein the second coupler has two outputs, out of phase with each other, entering a balanced photodetector, which provides the linearized RF output with reduced laser relative intensity noise and reduced even order distortions.

9. The linearized optical modulator of claim 7, wherein a phase control element controls an optical phase of the Carrier signal relative to the Carrier* output prior to the first coupler that combines them, ensuring that a relative phase difference is 180° and that the linearizing optical local oscillator signal, LO*, is equal to Carrier–attenuated Carrier*, wherein the first coupler having a second output being detected by a control photodetector, wherein an output of the control photodetector forms a feedback control signal that is fed into the phase control element.

10. The linearized optical modulator of claim 7, wherein a ratio of Carrier power to attenuated Carrier* power at the first coupler is 16, or 12 dB.

11. The linearized optical modulator of claim 7, further comprising a phase control element that controls an optical phase of the AM signal relative to the LO$^{fs}$* signal prior to the second coupler that combines them, ensuring that a relative phase difference is plus or minus 90°;
wherein DC bias photocurrents of two photodetectors in a balanced photodetector are compared to provide a feedback control signal that is fed into the phase control element.

12. The linearized optical modulator of claim 1, wherein the splitter additionally outputs a third output;
the third output enters a second MZI, being a MZI modulator Q, and the first MZI modulator being a MZI modulator I; thus forming a linearized I-Q modulator,
wherein the AM outputs of each MZI modulator are combined with a 90° phase shift between them in a third coupler, providing an I-Q AM output signal;
wherein Carrier* outputs of each MZI modulator are combined with no phase shift between them in a fourth coupler, providing an I-Q Carrier* output signal;
wherein said I-Q Carrier* output signal is attenuated and then subtracted from the Carrier signal in the first coupler, producing a linearizing optical local oscillator signal LO*, where LO*=Carrier–attenuated I-Q Carrier*;
wherein the LO* and the I-Q AM signals are coherently combined in the second coupler, and mixed in the following photodetector, thus removing or reducing third order distortion of the MZI output and providing the linearized RF output.

13. The linearized optical modulator of claim 12, wherein the second coupler has two outputs, out of phase with each other, entering a balanced photodetector, which provides the linearized RF output with reduced laser relative intensity noise and reduced even order distortions.

14. The linearized optical modulator of claim 12, wherein a phase control element controls an optical phase of the AM signal from the MZI modulator Q relative to the AM signal from the MZI modulator I prior to the third coupler that combines them, ensuring that a relative phase difference is 90°, forming the I-Q AM signal;
wherein the third coupler having a second output being detected by a control photodetector,
wherein an output of the control photodetector forms a feedback control signal that is fed into the phase control element.

15. The linearized optical modulator of claim 12, wherein a phase control element controls an optical phase of the Carrier* signal from the MZI modulator I relative to the Carrier* signal from the MZI modulator Q prior to the fourth coupler that combines them, ensuring that a relative phase difference is zero, forming the I-Q Carrier* signal;
wherein the fourth coupler having a second output being detected by a control photodetector, wherein an output of the control photodetector forms a feedback control signal that is fed into the phase control element.

16. The linearized optical modulator of claim 12, wherein a phase control element controls an optical phase of the Carrier signal relative to the attenuated I-Q Carrier* signal prior to the first coupler that combines them, ensuring that a relative phase difference is 180° and that the linearizing optical local oscillator signal, LO*, is equal to Carrier–attenuated I-Q Carrier*,
wherein the first coupler having a second output being detected by a control photodetector,
wherein an output of the control photodetector forms a feedback control signal that is fed into the phase control element.

17. The linearized optical modulator of claim 12, further comprising a phase control element that controls an optical phase of the LO* signal relative to the I-Q AM signal prior to the second coupler that combines them, ensuring that a relative phase difference is plus or minus 90°;
wherein the following photodetector is a balanced photodetector with DC bias photocurrents of two photodetectors being compared to provide a feedback control signal that is fed into the phase control element.

18. The linearized optical modulator of claim 12, where the I-Q optical modulator is configured as a single sideband (SSB) optical modulator, incorporating a single balanced photodetector;
wherein a ratio of Carrier power to attenuated I-Q Carrier* power is 9, or 9.5 dB.

19. The linearized optical modulator of claim 12, where the I-Q optical modulator is configured for quadrature amplitude modulation (QAM) or optical frequency division multiplexed (OFDM) modulation, wherein the second coupler and following photodetector is exchanged for a 90° optical hybrid and two balanced photodetectors arranged as a phase diversity receiver.

20. The linearized optical modulator of claim 1, wherein the linearized optical modulator is an integrated photonic device.

* * * * *